US011399010B1

(12) United States Patent
Clemons, Jr. et al.

(10) Patent No.: US 11,399,010 B1
(45) Date of Patent: *Jul. 26, 2022

(54) PRIVATE NETWORK REQUEST FORWARDING

(71) Applicant: United Services Automobile Association (USAA), San Antonio, TX (US)

(72) Inventors: Donald E. Clemons, Jr., San Antonio, TX (US); Christopher T. Wilkinson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/852,857

(22) Filed: Apr. 20, 2020

Related U.S. Application Data

(63) Continuation of application No. 15/887,818, filed on Feb. 2, 2018, now Pat. No. 10,630,645, which is a continuation of application No. 14/988,449, filed on Jan. 5, 2016, now Pat. No. 9,930,012, which is a continuation of application No. 13/797,110, filed on Mar. 12, 2013, now Pat. No. 9,930,011.

(Continued)

(51) Int. Cl.
*H04L 9/40* (2022.01)
*H04L 12/50* (2006.01)
(Continued)

(52) U.S. Cl.
CPC ...... *H04L 63/0236* (2013.01); *H04L 12/4625* (2013.01); *H04L 12/50* (2013.01);
(Continued)

(58) Field of Classification Search
CPC ............ H04L 12/4625; H04L 12/4641; H04L 63/02–029; H04L 63/08; H04L 63/10–107; H04L 63/1408–1425; H04L 63/1441–1466; H04L 63/20; H04L 67/10; H04L 67/28–2819; H04L 67/2866–2871; H04L 67/288–2885; H04L 67/2895; H04L 67/30–306
See application file for complete search history.

(56) References Cited

U.S. PATENT DOCUMENTS 7,260,639 B2    8/2007  Afergan et al.
7,587,609 B2 *  9/2009  Arnone ............... H04L 12/1895
                                                    709/206

(Continued)

OTHER PUBLICATIONS

U.S. Appl. No. 15/967,212, filed Apr. 30, 2018, Private Network Request Forwarding.

(Continued)

*Primary Examiner* — Kevin Bechtel
(74) *Attorney, Agent, or Firm* — Perkins Coie LLP

(57) ABSTRACT

Private network request forwarding can include receiving a request from a user for Internet services over a public network. Private network request forwarding can include analyzing the request and determining whether the request is legitimate. Private network request forwarding can include forwarding the request to an entity through a private network when it is determined that the request is legitimate, wherein the user has access to the entity through a proxy.

17 Claims, 3 Drawing Sheets

Related U.S. Application Data

(60) Provisional application No. 61/732,138, filed on Nov. 30, 2012.

(51) Int. Cl.
  *H04L 12/46*  (2006.01)
  *H04L 67/561*  (2022.01)

(52) U.S. Cl.
  CPC .......... *H04L 63/0272* (2013.01); *H04L 63/10* (2013.01); *H04L 63/1408* (2013.01); *H04L 63/0281* (2013.01); *H04L 63/1425* (2013.01); *H04L 67/2804* (2013.01)

(56) References Cited

U.S. PATENT DOCUMENTS

| | | |
|---|---|---|
| 2005/0018618 A1 | 1/2005 | Mualem et al. |
| 2005/0193429 A1 | 9/2005 | Demopoulos et al. |
| 2006/0037071 A1 | 2/2006 | Rao et al. |
| 2006/0075139 A1 | 4/2006 | Jungck |
| 2008/0229415 A1* | 9/2008 | Kapoor ................... H04L 63/14 726/22 |
| 2009/0077663 A1 | 3/2009 | Sun et al. |
| 2009/0126003 A1 | 5/2009 | Touboul |
| 2009/0262741 A1 | 10/2009 | Jungck et al. |
| 2012/0023090 A1 | 1/2012 | Holloway et al. |

OTHER PUBLICATIONS

U.S. Appl. No. 15/887,818, filed Feb. 2, 2018, Private Network Request Forwarding.

U.S. Appl. No. 14/988,449 U.S. Pat. No. 9,930,012, filed Jan. 5, 2016 Mar. 27, 2018, Private Network Request Forwarding.

U.S. Appl. No. 13/797,110 U.S. Pat. No. 9,930,011, filed Mar. 12, 2013 Mar. 27, 2018, Private Network Request Forwarding.

U.S. Appl. No. 61/73,2138, filed Nov. 30, 2012, Private Network Request Forwarding.

* cited by examiner

PRIVATE NETWORK REQUEST FORWARDING

CROSS-REFERENCE TO RELATED APPLICATION

This application is a continuation application of U.S. patent application Ser. No. 15/887,818, entitled "Private Network Request Forwarding," filed on Feb. 2, 2018, which is a continuation application of U.S. patent application Ser. No. 14/988,449, entitled "Private Network Request Forwarding," filed on Jan. 1, 2016, now U.S. Pat. No. 9,930,012, which is a continuation application of U.S. patent application Ser. No. 13/797,110, entitled "Private Network Request Forwarding," filed on Mar. 12, 2013, U.S. Pat. No. 9,930,011, which is a non-provisional application that claims the benefit of U.S. Provisional Application No. 61/732,138, filed Nov. 30, 2012, each of which is incorporated by reference herein in their entireties for all purposes.

TECHNICAL FIELD

The present disclosure relates to systems and methods for private network request forwarding.

BACKGROUND

A number of services can be provided over the Internet. Providing a number of services over the internet can expose vulnerabilities. Vulnerabilities can be exploited to disrupt the services. As one example, a denial of service attack can exploit vulnerabilities and disrupt the services. Such disruptions of services can, for example, cause physical and/or financial damages to entities (e.g., retailers, financial institutions, education institutions, etc.) providing services over the internet.

DETAILED DESCRIPTION

Figure 1:
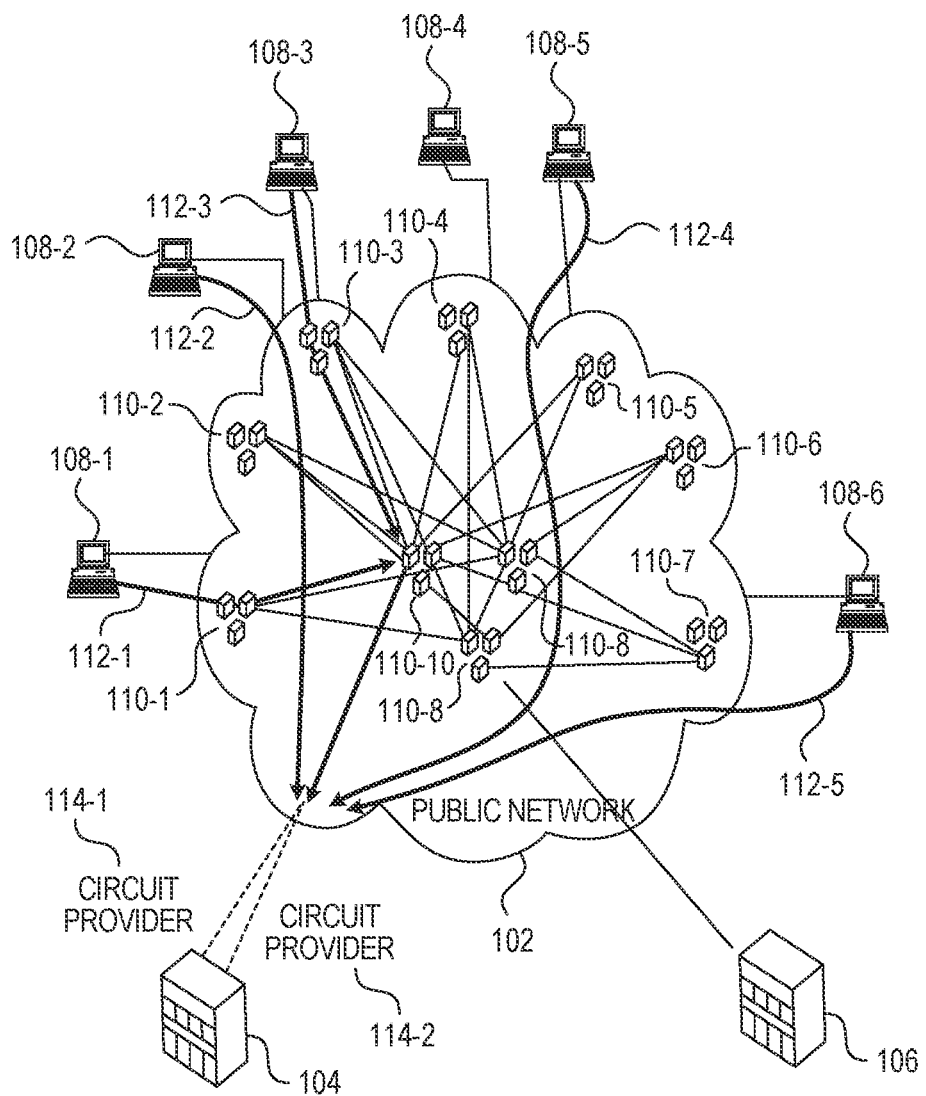
FIG. 1 illustrates an example of a public network structure according to previous approaches.

The present disclosure provides a private network infrastructure that can be used to deliver a number of requests to a content provider entity. A content delivery entity can receive a request from a user for Internet services over a public network. The content delivery entity can determine whether the request is legitimate (e.g., whether the request is not dangerous and/or does not pose a threat) by performing an analysis. The content delivery entity can forward the request to the content provider entity through a private network when it is determined that the request is legitimate. As described further herein, in a number of examples, the user has limited access to the content provider entity and/or the private network.

In a number of examples, a request can be determined to be legitimate or illegitimate based, at least partially, on an analysis of an access profile corresponding to the request. An access profile can comprise a number of different characteristics (e.g., data points, elements, etc.) associated with a request. As an example, an access profile can indicate whether the request is malformed (e.g., missing a portion such as a header), whether the request is associated with an expired token (e.g., security token), whether the request is associated with a prohibited region (e.g., based on point of origin), and/or whether the request violates a particular request protocol (e.g., TCP/IP, HTTP, etc.), among other characteristics.

In a number of example, additional request handling can be performed on the request if the analysis of the access profile results in a determination that a risk level (e.g., risk determination value) corresponding to the request is at or above a threshold level (e.g., the risk poses a "high risk" such that it may be more likely to be an illegitimate request). Additional request handling can include, for instance, dropping the request (e.g., preventing the request from being forwarded), limiting an access that the request has to the entity, relocating the request to a different node, and/or gathering further information associated with the request.

As used herein an entity (e.g., content delivery entity and/or content provider entity) can comprise a number of computing devices (e.g., servers) that can forward requests and/or generate replies based upon receipt of the requests. The entity can receive requests at the servers and a response can be originated at the servers.

A content provider entity can be an entity that provides content and/or services to a user. An entity can be, for example, a banking institution. A service can include generating machine readable instructions (MRI) that can be executed by a processing resource (e.g., a processor) to generate a website, for example. A content provider entity can provide the content directly and/or indirectly to the user. For example, a content provider entity can provide the content indirectly to the user through a content delivery entity (e.g., Akamai Technologies), which can include a distributed computing platform capable of accelerating content delivery, among various other capabilities.

As an example, a content delivery entity can receive requests from the user through a public network (e.g., via a number of nodes that can be part of a public network such as the Internet). The content delivery entity can deliver the requests to the content provider entity. The content delivery entity can deliver the requests when a node (e.g., computing device) that holds the requests forwards the requests to a server within the content provider entity. The content delivery entity can deliver the requests to the content provider entity over a private network. As such, embodiments of the present disclosure can limit a user's access to a content provider entity such that only requests that have been analyzed and/or authorized can be received by the content provider entity as compared to previous approaches that allow users direct access to the content provider entity (e.g., via a public network).

FIG. 1 illustrates an example of a public network structure according to previous approaches. In this example, a number of computing devices 108-1, 108-2, 108-3, 108-4, 108-5, and 108-6 (referred to generally as computing devices 108) are shown coupled to a public network 102 (e.g., the Internet). The example shown in FIG. 1 includes a content provider entity 104 and a content delivery entity 106 coupled to the public network 102. The public network 102 includes nodes 110-1, 110-2, 110-3, 110-4, 110-5, 110-6, 110-7, 110-8, 110-9, and 110-10 (referred to generally as nodes 110) used to facilitate communication between content provider entity 104, content deliver entity 106, and/or computing devices 108.

A number of requests (e.g., requests for services) can be generated by a number of users. A request for services can be a hypertext transfer protocol (http) request, for example. A request can include packets and/or other forms of communication used to request and/or provide data. As used herein, services can be services provided to a user through a website. For example, a content provider entity such as a banking entity can provide banking related services to users.

A user can interact with a number of entities in a public network 102 through computing devices 108 coupled to the public network 102. For example, a user can send a request through a computing device 108-1.

A user can refer to a computing device and/or a person using a computing device. A user can also refer to an automated user and/or a person using a computing device. An automated user can be, for example, a bank. In a number of examples, a person can initiate a transaction with a third party (e.g. the bank). The transaction can require that the third party (e.g., the user) send a request to the content provider entity 104 such that the request is sent from the third party to the content provider entity 104 in an automated fashion on behalf of the person. A third party request can be an automated teller machine (ATM) request, a kiosk request, an integrated voice response system request, among other types of request. Each of the previously mentioned types of requests can be associated with a type of transaction.

The computing devices 108 can include devices (e.g., computing devices 108-1, 108-3, 108-4) that send legitimate requests and devices (e.g., computing devices 108-2, 108-5, 108-6) that send illegitimate requests (e.g., requests determined to not be legitimate). As used herein, an illegitimate request refers to a request that may disrupt a number of services that the content provider entity 104 provides. Illegitimate requests can disrupt a number of services, for instance, by interfering with the function of a number of computing devices that are associated with the content provider entity 104 and associated infrastructures. Illegitimate requests can also disrupt the delivery capabilities of the content delivery entity 106. For example, an illegitimate request can be part of a denial of service attack and/or a number of other types of attacks that can pose a threat to a content provider entity. In the example shown in FIG. 1, the computing devices 108-2, 108-5, and 108-6 participate in a denial of service attack that targets the content provider entity 104.

A legitimate request can be a request that does not disrupt a number of services that the content provider entity 104 provides and/or the delivery capabilities of the content delivery entity 106. In this example, the computing devices 108-1, 108-3, and 108-4 represent computing devices providing legitimate requests.

Requests are sent from the computing devices 108 to a number of nodes, which can be controlled and/or owned by the content delivery entity 106, for example. In this example, the number of nodes comprise nodes 110-1, 110-2, 110-3, 110-4, 110-5, 110-6, 110-7, 110-8, 110-9, and 110-10 (referred to generally as nodes 110). However, there can be more or fewer nodes than those depicted in FIG. 1. The nodes 110 can receive requests from computing devices 108 using a public infrastructure that is associated with the public network 102. The number of nodes 110 can comprise computing devices (e.g., servers) that can receive requests and forward requests (e.g., deliver requests), among other capabilities. The number of nodes 110 can have associated public and/or private Internet Protocol (IP) addresses. The number of nodes 110 can be part of the private network and or a public network 102.

The public network 102 can be a network that is accessible to users through the computing devices 108 and through the public network infrastructure. A public network 102 can be used to send and receive requests between nodes 110. The example of FIG. 1 illustrates computing device 108-1 sending a request that follows a path 112-1, computing device 108-2 sending a request that follows a path 112-2, computing device 108-3 sending a request that follows a path 112-3, computing device 108-5 sending a request that follows a path 112-4, and computing device 108-6 sending a request that follows a path 112-5.

The nodes 110 can be associated with a number of public IP addresses that can be used to identify the nodes 110. The public IP addresses can be used in the delivery and the forwarding of requests. For example, a user can send a request to a node 110-1 by identifying a public IP address that is associated with the node 110-1 and by including the public IP address in the request. An IP address may be considered public if users can send a request directly to the IP address from any Internet Service Provider network connection. An IP address may be considered public if users can send a request directly to the IP address without the request traversing a private network. In a public network 102 a request can traverse a number of different paths. An IP address can be public, even though some of the paths can modify the subject matter of requests, when at least one path exists that allows requests to be delivered without the possibility of the subject matter of the requests being modified. As used herein, public IP addresses can be associated with nodes 110, circuit providers 114-1 and 114-2, and/or computing devices 108, among other devices.

In this example, the request traversing the path 112-1 is sent from the computing device 108-1 to node 110-1, which forwards the request to node 110-10. Node 110-10 sends the request to the content provider entity 104 through a circuit provider 114-1 and/or through a circuit provider 114-2. The request traversing the path 112-3 is sent from the computing device 108-3 to the node 110-3, which forwards the request to node 110-10. Node 110-10 delivers the request to the content provider entity 104 through the circuit provider 114-1 and/or through the circuit provider 114-2. As such, the node 110-10 can deliver requests to the content provider entity 104 using the public network 102 (e.g., by forwarding the request to the circuit provider 114-1 and/or 114-2).

As used herein, an internet circuit provider can be a number of computing devices that can create a circuit with the content provider entity 104. The circuit can comprise of a dedicated connection between the circuit provider 114-1 and/or the circuit provider 114-2 (e.g., computing devices associated with the circuit providers 114-1 and/or 114-2) and the content provider entity 104. A dedicated connection can guarantee a specified bandwidth that is associated with the dedicated connection to the content provider entity 104. The circuit providers 114-1 and 114-2 can receive requests through a public IP address. The public IP address associated with the circuit providers 114-1 and 114-2 can be accessible to the computing devices 108 (e.g., users associated with the computing devices 108). The computing devices 108 can send a number of requests directly to the circuit providers 114-1 and/or 114-2 without going through the nodes 110. For example, the computing devices 108 can send a number of requests directly to the circuit providers 114-1 and/or 114-2 through node 110-8 and/or other nodes that are not part of the content delivery entity 106.

The content delivery entity 106 can determine whether the requests received at the nodes 110 are legitimate requests or illegitimate requests. For example, the nodes 110 can analyze the requests to determine whether the requests may pose a threat to the content provider entity 104 and/or the content delivery entity 106. The analysis can identify a number of different types of threats (e.g., denial of service attack and/or buffer overflow attack, among other types of attacks). The analysis can include different types of analysis used to detect different types of threats and/or attacks. The content delivery entity 106 can forward requests that are legitimate.

The content delivery entity 106 can drop the request by filtering the requests that are identified as illegitimate requests. For example, illegitimate requests can be filtered by the nodes 110 such that the illegitimate requests are not forwarded after they are identified as illegitimate.

The analysis can be performed at a number of selected nodes. For example, the analysis can be performed at the node 110-8, the node 110-9, and/or the node 110-10, among other nodes. In a number of examples, the analysis can be performed at each of the nodes 110.

In previous approaches, using a public network infrastructure to deliver requests from the computing devices 108 to the content provider entity 104 and/or content delivery entity 106 can expose the content provider entity 104 and/or the content delivery entity 106 to illegitimate requests. For example, a user can send illegitimate requests to the content provider entity 104 by sending the requests to the public IP address where the content provider entity 104 receives requests from the content delivery entity 106. A user can look-up (e.g., resolve) an address (e.g., public IP address) where the content provider entity 104 receives requests from the content delivery entity 106.

In the example shown in FIG. 1, a user sends illegitimate requests to the content provider entity 104 through the computing devices 108-2, 108-5, and/or 108-6. As shown, the computing devices 108-2, 108-5, and/or 108-6 can send the illegitimate requests directly to the content provider entity 104 (e.g., by sending the requests to a public IP address where the content provider entity 104 receives requests from the content delivery entity 106 without having the requests travel through the nodes 110). The illegitimate requests can be delivered through an infrastructure that is associated with the public network 102. The illegitimate requests can reach the content provider entity 104 because the illegitimate requests have not been filtered (e.g., by the nodes 110).

In the case of a denial of service attack, the illegitimate requests can be delivered through the first circuit providers 114-1 and/or 114-2. For example, a user that is sending the illegitimate requests can determine that the content provider entity 104 receives requests through the circuit providers 114-1 and/or 114-2 (e.g., by identifying a public IP address associated with the circuit providers 114-1 and/or 114-2). The user can send the illegitimate requests directly to the circuit providers 114-1 and/or 114-2 such that the illegitimate requests do not pass through the nodes 110 and, as a result, cannot be analyzed. The circuit providers 114-1 and/or 114-2 can be part of the infrastructure that is associated with the public network 102. A user, or a number of users, can flood circuit providers 114-1 and/or 114-2 with illegitimate requests such that legitimate requests may not be able to reach the content provider entity 104.

Figure 2:
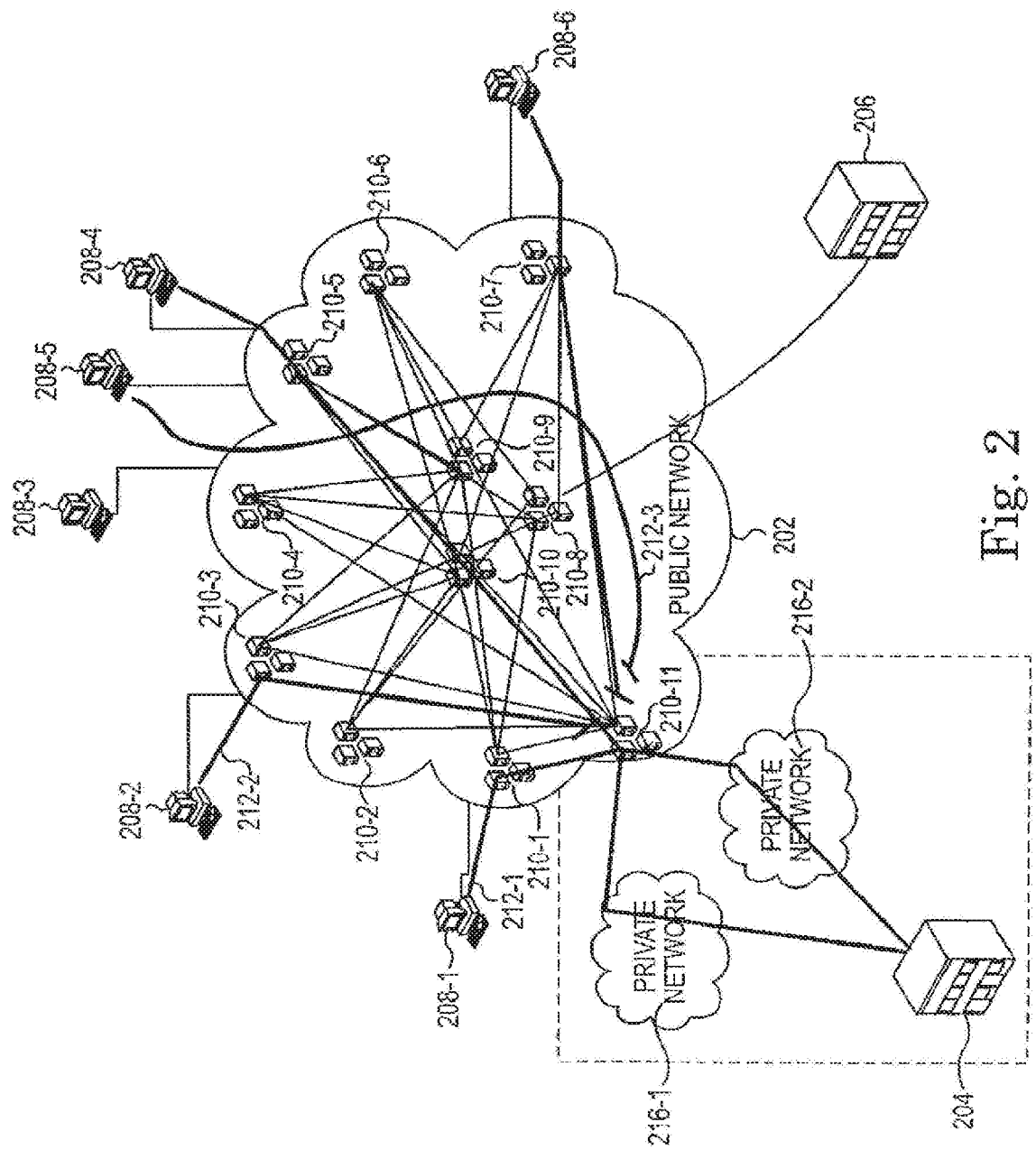
FIG. 2 illustrates a system for private network request forwarding in accordance with a number of embodiments of the present disclosure.

FIG. 2 illustrates a system for private network request forwarding in accordance with a number of embodiments of the present disclosure. In this example, a number of computing devices 208-1, 208-2, 208-3, 208-4, 208-5, and 208-6 (referred to generally as computing devices 208) are analogous to computing devices 108-1, 108-2, 108-3, 108-4, 108-5, and 108-6 in FIG. 1 and are shown coupled to a public network 202 (e.g., the Internet) which is analogous to public network 102 in FIG. 1. The example shown in FIG. 2 includes a content provider entity 204 and a content delivery entity 206 which are analogous to content provider entity 104 and content delivery entity 106 in FIG. 1, respectively, and which are coupled to the public network 202 through a number of nodes. The public network 202 includes nodes 210-1, 210-2, 210-3, 210-4, 210-5, 210-6, 210-7, 210-8, 210-9, and 210-10 (referred to generally as nodes 210) which are analogous to nodes 110-1, 110-2, 110-3, 110-4, 110-5, 110-6, 110-7, 110-8, 110-9, and 110-10 in FIG. 1, respectively. The nodes 210 can be used to facilitate communication between content provider entity 204, content deliver entity 206, and/or computing devices 208.

In FIG. 2, the computing devices 208 can send a number of requests to the content provider entity 204 and/or a content delivery entity 206 through a number of nodes 210. The nodes 210 can also include a node 210-11. The nodes 210 can forward requests to the node 210-11. The node 210-11 can receive requests from the other nodes 210. The node 210-11 can analyze the requests to determine whether the requests are illegitimate requests or legitimate requests. In a number of examples, the requests can be analyzed multiple times. For example, a request can be analyzed at the node 210-10 and again at the node 210-11.

In the example shown in FIG. 2, legitimate requests can be delivered to the content provider entity 204 through the private networks 216-1 and/or 216-2 (referred to generally as private networks 216). The private networks 216 consist of dedicated connections between the content provider entity 204 and the node 210-11. The private networks 216 can comprise a number of computing devices that assist in forwarding the requests along the dedicated connections. A private network can be a physical connection and/or a virtual connection. For example, a private network can be a private multi-protocol label switching (MPLS) network, among other types of private networks 216. The private network 216 can include a private network infrastructure with a number of computing devices that have associated private IP addresses.

An IP address may be considered private if the subject matter of the requests that are delivered to the IP address can be modified. An IP address can also be considered private if it is part of a private network. In this example, private IP addresses are associated with content provider entity 204 and node 210-11.

As used herein, a private network 216 is different than circuit providers 114-1 and 114-2 in FIG. 1 because computing devices that are part of the private network 216 are associated with private IP addresses and computing devices that are associated with circuit provider 114-1 and 114-2 are associated with public IP addresses. A private network 216 is also different than circuit providers 114-1 and 114-2 because users do not have direct access to the private network 216 and because users have direct access to the circuit providers 114-1 and 114-2 that are part of the public network 102 in FIG. 1.

The example of FIG. 2 illustrates the private networks 216 being separate from the public network 202. The private networks 216 limit access that a number of users have to the content provider entity 204. For instance, the private networks 216 can limit access by not having an associated public IP address such that the users do not have direct access to the private networks 216. A user that can resolve a public IP address may not be able to resolve a private IP address. In a number of examples, the content provider entity 204 can only receive requests through the private networks 216 such that the content provider entity 204 is not directly associated with a public IP address that is directly accessible by device 208. The content provider entity 204 is considered to not have a public IP address directly associated therewith since the content provider entity 204 can only receive requests that are forwarded from the node 210-11 through the private networks 216.

For example, a user can send a number of illegitimate requests from the computing devices 208-2 and 208-5. The example of FIG. 2 illustrates computing device 208-2 sending a request that follows a path 212-2. The request is received from the computing device 208-2 at the node 210-3. This node 210-3 forwards the request to the node 210-11. The node 210-11 can analyze the request (e.g., an access profile corresponding to the request) to determine whether the request is an illegitimate request. Illegitimate requests can be dropped (e.g., filtered) by the node 210-11 based on a determination that the request is illegitimate. A request that originated at the computing device 208-5 follows a path 212-3. For example, the computing device 208-5 sent a request directly to the node 210-11. The node 210-11 can analyze the request and determine whether the request is a legitimate request.

The content delivery entity 206 and/or the node 210-10 can perform additional request handling, for example, when analysis of the request indicates that a risk level of the request is at or above a threshold risk level. The additional request handing can include dropping a request, limiting an access that the request has to the entity, modifying the request, relocating the request to a different node, and/or gathering more information that is associated with the request. The additional request handling can be used to determine whether the request is legitimate or illegitimate.

The content delivery entity 206 can filter requests that are determined to be (e.g., identified as) illegitimate requests. For example, illegitimate requests can be filtered by the node 210-11 such that the requests are dropped (e.g., not forwarded) after they are determined to be illegitimate.

The content delivery entity 206 can limit an access that the requests have to the entity by modifying the access profile corresponding to the requests. An access profile can be used to determine an access level that is associated with the requests by granting a number of privileges and/or retaining a number of privileges that an entity can use to determine the access that the requests will have to a number of computing devices that are associated with the entity 206. An access profile can be analyzed to determine a risk level that a request may pose to a content provider entity 204. The risk level can be determined based on a number of characteristics associated with a request. For example, a risk can be calculated based on a point of origin of the request, historical trends associated with the request, missing header elements in a request, protocol misuse and/or violations associated with the request, among other request characteristics. This risk level can be used to determine various actions to be applied to the request (e.g., transaction).

The content delivery entity 206 can modify the requests (e.g., based on the additional request handling). The requests can be modified so as to be reclassified as legitimate, for example. The content delivery entity 206 can relocate the requests to a number of nodes. For example, a request that is analyzed at a node 210-11 can be relocated to a node 210-1 for further analysis. Furthermore, the content delivery entity 206 can gather more information that is associated with the requests to determine whether the requests are legitimate. The content delivery entity 206 can gather further information by requesting the information from the user. Other request handling examples can be used such that the request handling protects the entity 206 from illegitimate requests.

A user that sends illegitimate requests to the content provider entity 204 can send requests to the node 210-11 and/or to the nodes 210 and not the content provider entity 204 because the content provider entity 204 does not have a public IP address. A user cannot send a request directly to the private networks 216 because the private networks 216 do not have associated public IP addresses to which the user can send the illegitimate requests. A public IP address can be a static IP address and/or a dynamic IP address. A public IP address can refer to an IP address that is assigned to a computing device that is directly accessible to a user through a public network (e.g., the public network 202).

The content provider entity 204 that does not have a public IP address can be referred to as "off line" even though the content provider entity 204 continues to receive requests though the node 210-11. The content provider entity 204 can be considered "off line" because a user cannot access the content provider entity 204 directly.

The content provider entity 204, and/or the private networks 216 can be considered directly accessible by a user because a user can send a request to the computing device without the request being analyzed before the request reaches the computing device. The node 210-11 can analyze a request before the node 210-11 forwards the request through the private networks 216. A node 210-11 can analyze every request even if the request has previously been analyzed by a different node to ensure that only requests that are analyzed are forwarded to the private network 216-2. The computing devices that are associated with the content provider entity 204 can be considered to be not directly accessible to a user if the requests that the user sends to the content provider entity 204 can be analyzed and/or modified before the requests reach the private networks 216. The user can have indirect access to the entity 204 through the node 210-11. The node 210-11 can provide proxy access to the entity 204 when the node 210-11 forwards requests to the content provider entity 204. In a number of examples, the computing devices that are associated with the content provider entity 204 are not directly accessible to a user when the requests that the user sends to the content provider entity 204 can be analyzed and/or modified before they are delivered to content provider entity 204 and while they are being delivered by private network 216. For example, a request that is traversing a private network 216 through a first computing device and a second computing device before it is delivered to the content provider entity 204 can be analyzed and/or modified at the first computing device and/or the second computing device.

In FIG. 2, legitimate requests sent from a computing device 208-1 traverse a path 212-1. The requests are sent from the computing device 208-1 to the node 210-1. The node 210-1 forwards the requests to the node 210-11. The node 210-11 analyzes the requests and determines whether the requests are legitimate. Legitimate requests are forwarded by the node 210-11 to the content provider entity 204 through the private network 216-2.

A routing policy can be created for requests that traverse through the private networks 216 and are received by the content provider entity 204. The routing policy can define a path that requests must follow to reach the content provider entity 204. For example, the path can be from the node 210-11 through the private networks 216 to the content provider entity 204. In a number of examples, a number of nodes similar to nodes 210-11 can be coupled to the public network and the private networks such that a routing policy can define which of the nodes forward requests through the private network 204. For example, a first node, a second node, and a third node that are coupled to the private networks 216 and the public network 202 can receive requests at a number of public IP address and can forward the requests through the private networks 216. Each of the first node, the second node, and/or the third node can analyze and/or modify requests that are received and that are forwarded. A routing policy can determine whether the first node, the second node, and/or the third node forward requests through the private network 216-1 and/or through private network 216-2. The first node can be coupled to the public network 202 through a first public IP address and to the private networks 216 through a first private IP address, the second node can be coupled to the public network 202 through a second public IP address and to the private networks 216 through a second private IP address, and/or the third node can be coupled to the public network 202 through a third public IP address and to the private networks 216 through a third private IP address, for example.

In a number of examples, a routing policy can define a number of paths that can be taken before a request reaches its destination, and the requests can be analyzed before entering the paths. For example, a content provider entity 204 can have a number of distributed sites at which requests can be received. Each of the distributed sites can have an associated private network. Each of the private networks can be associated with a node that receives requests and analyzes the requests before forwarding legitimate requests through the associated private network. The distributed sites, the nodes, and/or the associated private networks can be part of the routing policy.

Figure 3:
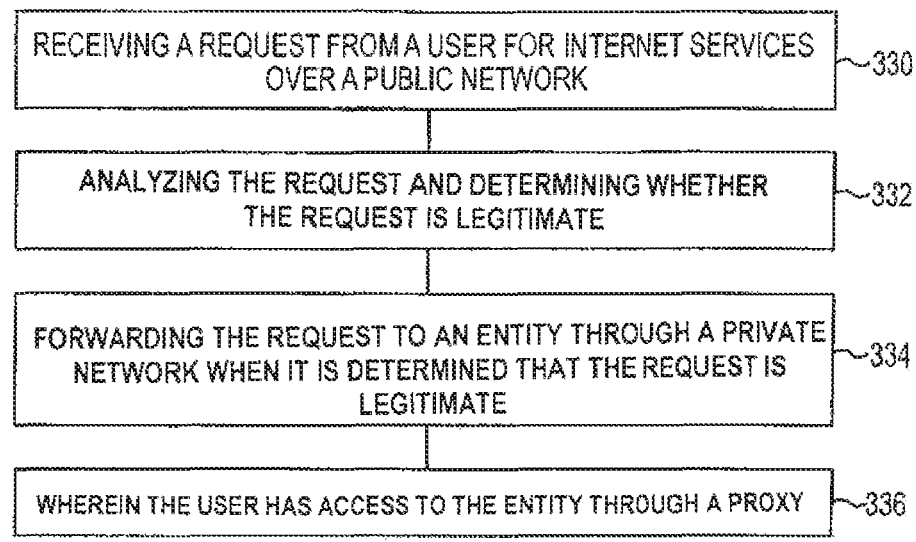
FIG. 3 is a block diagram of an example method in accordance with a number of embodiments of the present disclosure.

FIG. 3 is a block diagram of an example method in accordance with a number of embodiments of the present disclosure. At 330, a request for Internet services is received from a user over a public network (e.g., Internet). The public network can be accessed by a number of computing devices that can comprise hardware, machine readable instructions (e.g., software), and/or firmware. For example, a computing device can be a handheld computing device such as a smartphone and/or tablet, among other types of computing devices.

A public network can be composed of public network infrastructure. The public network infrastructure can enable a user to establish a connection and/or send a request to a number of other computing devices. The user can communicate directly with the public network infrastructure when the content of the requests are not modified and/or when the content of the requests consistently reach their destinations.

At 332, the request is analyzed to determine whether the request is legitimate. In a number of examples, a determination can be made at a node that received the request. A determination that the request is illegitimate can result in the node denying delivery of the request and/or taking a remedial action, for example.

At 334, the request is forwarded to an entity (e.g., content provider entity) through a private network when it is determined that the request is legitimate. The request can be forwarded through the private network without relying on the public network As indicated at 336, the access that a user has to the entity can be provided by a proxy. Providing access through a proxy can limit the access that a user has to an entity. Limited access can include forwarding requests to the entity (e.g., content provider entity) after the requests have been analyzed by a proxy (e.g., node) associated with the content delivery entity. Limited access can include dropping requests when the requests are identified as illegitimate. Limited access can include denying the user direct access to the entity and/or the private network.

Limiting access to the entity (e.g., content provider entity) can result in all requests being analyzed before they are forwarded to the entity. Furthermore, limiting access to the entity can deny direct access to a user sending requests to the entity. Creating a single route that requests must traverse to reach the entity can provide for one standard of analysis to be implemented.

The method can be executed by a computing device that can be a combination of hardware and program instructions configured to perform a number of functions. The hardware, for example, can include one or more processing resources, machine readable medium (MRM) memory resource, etc. The program instructions, e.g., machine-readable instructions (MRI), can include instructions stored on the MRM to implement a desired function, e.g., private network forwarding, as described above.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a" or "a number of" used in referring to a particular thing is intended refer to one or more such things. For example, "a number of databases" can refer to one or more databases.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed is:

1. A computer-implemented method for packet handling, the method comprising:
   receiving, by a first node of a public network having a public Internet Protocol (IP) address, a first request and a second request from at least one computing device via the public network;
   performing, by the first node, a first analysis of the first request and the second request;

classifying the first request as legitimate based on the first analysis of the first request,
  wherein the first analysis of the request is based on at least two of an origin of at least one first data packet, an expired token of the at least one data first packet, or at least one missing header element in the at least one first data packet;
in response to the first request being classified as legitimate, transmitting the first request to a server via a private network,
  wherein the server is coupled only to the private network;
classifying the second request as illegitimate based on the first analysis of the second request,
  wherein the first analysis of the second request is based on at least two of an origin of at least one second data packet, an expired token of the at least one second data packet, or at least one missing header element in the at least one second data packet;
in response to the second request being classified as illegitimate:
  transmitting the second request to a second node;
  performing, by the second node, a second analysis of the second request based at least in part on the second request; and
  in response to the second node determining that the second request is legitimate, routing the second request to the server via the private network.

2. The computer-implemented method of claim 1, wherein the server is not in communication with the computing device.

3. The computer-implemented method of claim 1, wherein the computing device is one of an automated teller machine, a kiosk, or an integrated voice response system.

4. The computer-implemented method of claim 1, wherein in response to the second request being classified as illegitimate, the method further comprises:
  receiving, by the first node from the second node, a response data packet via the public network; and
  transmitting, by the first node, to the computing device the response data packet,
  wherein the response data packet is generated by the server.

5. The computer-implemented method of claim 4, wherein the response data packet is transmitted, by the server via the private network, to the second node.

6. The computer-implemented method of claim 1, wherein the first analysis is a first risk analysis, wherein the second analysis is a second risk analysis.

7. A computer system comprising:
a plurality of nodes associated with a content delivery entity, each node comprising a memory and a processing unit coupled to the memory,
wherein the processing unit of a first node of the plurality of nodes is coupled to a public network having a public Internet Protocol, wherein the first node has a public Internet Protocol (IP) address corresponding to the public network, wherein the first node is configured to:
  receive a request from a computing device via the public network;
  perform a first analysis of the request;
  classify the request as legitimate or illegitimate based on the first analysis of the request,
    wherein the first analysis of the request is based on at least two of an origin of at least one data packet, an expired token of the at least one data packet, or at least one missing header element in the at least one data packet;
  in response to the request being classified as legitimate, transmit the request to a server via a private network,
    wherein the server is coupled only to the private network;
  in response to the request being classified as illegitimate:
    transmit the request to a second node;
wherein the processing unit of the second node is coupled to the private network having a private Internet Protocol, wherein the second node is configured to:
  perform a second analysis of the request based at least in part on the request; and
  in response to the second node determining that the request is legitimate, route the request to the server via the private network.

8. The computer system of claim 7, wherein the server is not in communication with the computing device.

9. The computer system of claim 7, wherein the computing device is one of an automated teller machine, a kiosk, or an integrated voice response system.

10. The computer system of claim 7, wherein in response to the request being classified as illegitimate, the second node is further configured to:
  receive, by the first node from the second node, a response data packet via the public network; and
  transmit, by the first node, to the computing device the response data packet,
  wherein the response data packet is generated by the server.

11. The computer system of claim 10, wherein the response data packet is transmitted, by the server via the private network, to the second node.

12. The computer system of claim 7, wherein the first analysis is a first risk analysis, wherein the second analysis is a second risk analysis.

13. A content delivery system comprising:
a public network having a public Internet Protocol, the public network coupled to a first node, wherein the first node is configured to:
  receive a request from a computing device via the public network;
  perform a first analysis of the request;
  classify the request as legitimate or illegitimate based on the first analysis of the request,
    wherein the first analysis of the request is based on at least two of an origin of at least one data packet, an expired token of the at least one data packet, or at least one missing header element in the at least one data packet;
  in in response to the request being classified as legitimate, transmit the request to a server via a private network,
    wherein the server is coupled only to the private network;
  in response to the request being classified as illegitimate:
    transmit the request to a second node;
the private network having a private Internet Protocol, the private network coupled to the second node and the server, wherein the second node is configured to:
  perform a second analysis of the request based at least in part on the request; and
  in response to the second node determining that the request is legitimate, route the request to the server via the private network.

14. The content delivery system of claim 13, wherein the server is not in communication with the computing device.

15. The content delivery system of claim 13, wherein the computing device is one of an automated teller machine, a kiosk, or an integrated voice response system.

16. The content delivery system of claim 13, wherein in response to the request being classified as illegitimate, the second node is further configured to:

receive, by the first node from the second node, a response data packet via the public network; and transmit, by the first node, to the computing device the response data packet, wherein the response data packet is generated by the server, wherein the response data packet is transmitted, by the server via the private network, to the second node.

17. The content delivery system of claim 13, wherein the first analysis is a first risk analysis, wherein the second analysis is a second risk analysis.

* * * * *